United States Patent
Yang (10) Patent No.: US 12,316,136 B2
(45) Date of Patent: May 27, 2025

(54) RECTIFIER CIRCUIT AND RECEIVER CIRCUIT

(71) Applicant: Realtek Semiconductor Corporation, Hsinchu (TW)

(72) Inventor: Zong-Ying Yang, Hsinchu (TW)

(73) Assignee: Realtek Semiconductor Corporation, Hsinchu (TW)

( * ) Notice: Subject to any disclaimer, the term of this patent is extended or adjusted under 35 U.S.C. 154(b) by 242 days.

(21) Appl. No.: 18/331,932

(22) Filed: Jun. 8, 2023

(65) Prior Publication Data
US 2024/0305140 A1    Sep. 12, 2024

(30) Foreign Application Priority Data
Mar. 9, 2023   (TW) .................................. 112108755

(51) Int. Cl.
*H02J 50/00* (2016.01)
*H02J 50/20* (2016.01)
*H02M 1/04* (2006.01)

(52) U.S. Cl.
CPC ............ *H02J 50/20* (2016.02); *H02J 50/001* (2020.01); *H02M 1/045* (2013.01)

(58) Field of Classification Search
CPC ........ H02J 50/20; H02J 50/001; H02M 1/045; H02M 7/219
See application file for complete search history.

(56) References Cited

U.S. PATENT DOCUMENTS

| | | | |
|---|---|---|---|
| 10,312,743 B2 | 6/2019 | Ouda et al. | |
| 2015/0213757 A1* | 7/2015 | Takahama | G09G 3/3291 345/691 |
| 2016/0043697 A1* | 2/2016 | Uppathil | H04L 27/3809 375/345 |
| 2021/0064070 A1* | 3/2021 | Hanschke | G05F 1/565 |

OTHER PUBLICATIONS

Ping-Hsuan Hsieh et al., "An RF Energy Harvester With 44.1% PCE at Input Available Power of -12 dBm," in IEEE Transactions on Circuits and Systems I: Regular Papers, vol. 62, No. 6, pp. 1528-1537, Jun. 2015, doi: 10.1109/TCSI.2015.2418834.
Pengcheng Xu et al., "Analysis, Modeling, and Design of a 2.45-GHz RF Energy Harvester for SWIPT IoT Smart Sensors," in IEEE Journal of Solid-State Circuits, vol. 54, No. 10, pp. 2717-2729, Oct. 2019, doi: 10.1109/JSSC.2019.2914581.

* cited by examiner

*Primary Examiner* — Adolf D Berhane
*Assistant Examiner* — Afework S Demisse
(74) *Attorney, Agent, or Firm* — CKC & Partners Co., LLC (57) ABSTRACT

A rectifier circuit having first and second match circuits, a bias circuit, first and second switches is provided. The first match circuit has first and second terminals and receives a first input signal. The second match circuit receives a second input signal. The bias circuit provides a first bias voltage to the second terminal of the first match circuit and a second bias voltage to the first terminal of the second match circuit. The first switch is coupled to the first terminal of the first match circuit and an output terminal of the rectifier circuit and updates an output signal according to the first input signal. The second switch is coupled to the second terminal of the second match circuit and the output terminal and updates the output signal according to the second input signal.

20 Claims, 6 Drawing Sheets

RECTIFIER CIRCUIT AND RECEIVER CIRCUIT

CROSS-REFERENCE TO RELATED APPLICATION

This application claims priority to Taiwan Application Serial Number 112108755, filed Mar. 9, 2023, which is herein incorporated by reference in its entirety.

BACKGROUND

Field of Invention

The present invention relates to a rectifier circuit and a receiver circuit. More particularly, the present invention relates to a rectifier circuit and a receiver circuit with a bias circuit.

Description of Related Art

The technology of radio frequency energy harvesting is suitable for supplying power for some wireless communication electronic devices, for example, internet of things (IoT) devices. The technology of radio frequency energy harvesting is to harvest the energy in the air through an antenna and converts the signal in the air to a direct current power that can be provided to an electronic device through a rectifier circuit. How to improve the power conversion efficiency of the radio frequency energy harvesting circuit to efficiently use the low power radio frequency signal in the air is an important part of radio frequency energy harvesting circuit design.

SUMMARY

In some embodiments, a rectifier circuit is provided. The rectifier circuit comprises a first match circuit, a second match circuit, a bias circuit, a first switch and a second switch. The first match circuit has a first terminal and a second terminal and receives a first input signal. The second match circuit receives a second input signal, in which the first input signal and the second input signal are inverted. The bias circuit provides a first bias voltage to the second terminal of the first match circuit and provides a second bias voltage to a first terminal of the second match circuit. The first switch is coupled to the first terminal of the first match circuit and an output terminal of the rectifier circuit and turns on in response to a first signal from the first terminal of the second match circuit and updates an output signal at the output terminal according to the first input signal when a voltage value of the first input signal is larger than a voltage value of the second input signal. The second switch is coupled to a second terminal of the second match circuit and the output terminal and turns on in response to a second signal from the second terminal of the first match circuit and updates the output signal according to the second input signal when a voltage value of the second input signal is larger than the voltage value of the first input signal.

In some embodiments, a receiver circuit is provided. The receiver circuit comprises an antenna circuit and a rectifier circuit. The rectifier circuit generates an output signal at an output terminal of the rectifier circuit and comprises a first switch set, a second switch set, a bias circuit, a first match circuit and a second match circuit. The first switch set has a first input terminal and a second input terminal and rectifies a first signal from the first input terminal of the first switch set to update the output signal. The second switch set has a third input terminal and a fourth input terminal and rectifies a second signal from the third input terminal of the second switch set to update the output signal, in which the first signal and the second signal are inverted. The bias circuit provides a first bias voltage to the second input terminal of the first switch set and provides a second bias voltage to the fourth input terminal of the second switch set. The first match circuit and the second match circuit match an impedance of the antenna circuit with an impedance of the rectifier circuit, in which the first match circuit has a first output terminal coupled to the first input terminal of the first switch set and a second output terminal coupled to the fourth input terminal of the second switch set, and the second match circuit has a third output terminal coupled to the third input terminal of the second switch set and a fourth output terminal coupled to the second input terminal of the first switch set.

In some embodiments, a rectifier circuit is provided. The rectifier circuit comprises a first capacitor, a second capacitor, a third capacitor, a fourth capacitor, a first resistor, a second resistor, a first transistor, a second transistor, a third transistor and a fourth transistor. A first terminal of the first capacitor and a first terminal of the second capacitor are coupled to a first input terminal of the rectifier circuit. A first terminal of the third capacitor and a first terminal of the fourth capacitor are coupled to a second input terminal of the rectifier circuit. A first terminal of the first resistor is coupled to a second terminal of the fourth capacitor and a second terminal of the first resistor is grounded. A first terminal of the second resistor is coupled to a second terminal of the second capacitor and a second terminal of the second resistor is grounded. A gate terminal of the first transistor is coupled to the first terminal of the first resistor, a first source/drain terminal of the first transistor is coupled to a second terminal of the first capacitor and a second source/drain terminal of the first transistor is coupled to a output terminal of the rectifier circuit. A gate terminal of the second transistor is coupled to first terminal of the first resistor, a first source/drain terminal of the second transistor is coupled to the second terminal of the first capacitor and a second source/drain terminal of the second transistor is grounded. A gate terminal of the third transistor is coupled to the first terminal of the second resistor, a first source/drain terminal of the third transistor is coupled to a second terminal of the third capacitor and a second source/drain terminal of the third transistor is coupled to the output terminal. A gate terminal of the fourth transistor is coupled to the first terminal of the second resistor, a first source/drain terminal of the fourth transistor is coupled to the second terminal of the third capacitor and a second source/drain terminal of the fourth transistor is grounded, in which the first to the fourth capacitors, the first resistor, the second resistor and the first to the fourth transistors cooperate to rectify a differential signal pair received from the first input terminal and the second input terminal and output a rectified signal at the output terminal.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

The terms used in this specification generally have their ordinary meanings in the art and in the specific context where each term is used. The use of examples in this specification, including examples of any terms discussed herein, is illustrative only, and in no way limits the scope and meaning of the disclosure or of any exemplified term. Likewise, the present disclosure is not limited to various embodiments given in this specification.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly. As used herein, the term "and/or" includes any and all combinations of one or more of the associated listed items.

As used herein, "around", "about", "approximately" or "substantially" shall generally refer to any approximate value of a given value or range, in which it is varied depending on various arts in which it pertains, and the scope of which should be accorded with the broadest interpretation understood by the person skilled in the art to which it pertains, so as to encompass all such modifications and similar structures. In some embodiments, it shall generally mean within 20 percent, preferably within 10 percent, and more preferably within 5 percent of a given value or range. Numerical quantities given herein are approximate, meaning that the term "around", "about", "approximately" or "substantially" can be inferred if not expressly stated, or meaning other approximate values.

Figure 1:
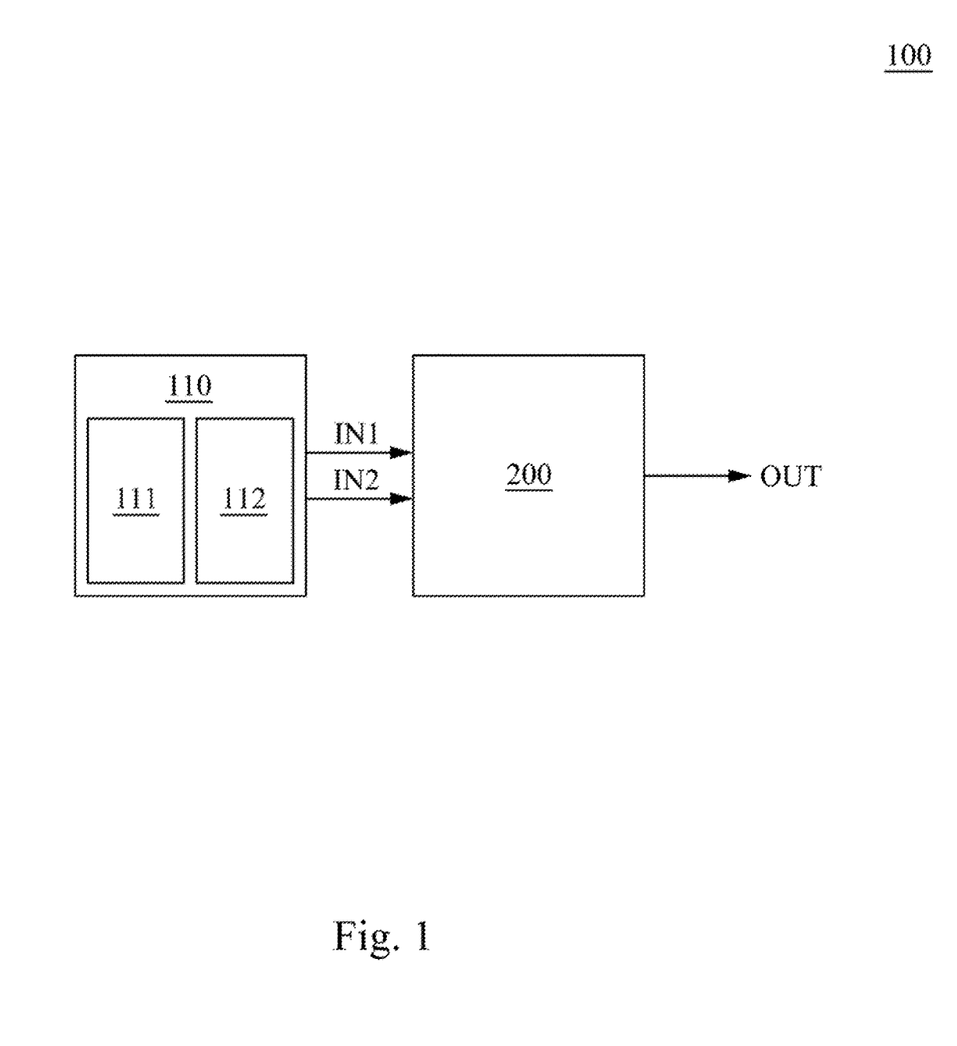
FIG. 1 is a schematic diagram of a receiver circuit in accordance with some embodiments of the present disclosure.

FIG. 1 is a schematic diagram of a receiver circuit 100 in accordance with various embodiments. In some embodiments, the receiver circuit 100 is configured as a radio frequency (RF) energy harvester circuit. For illustration, as shown in FIG. 1, the receiver circuit 100 includes an antenna circuit 110 and a rectifier circuit 200. In some embodiments, the rectifier circuit 200 has an input terminal IN1, an input terminal IN2 and an output terminal OUT. The input terminal IN1 and the input terminal IN2 are coupled to the antenna circuit 110.

In operation, according to some embodiments of the present disclosure, the antenna circuit 110 includes an antenna 111 and a balun 112. In some embodiments, the balun 112 is configured to convert a single-ended signal generated by the antenna 111 to a differential signal pair. In some embodiments, the antenna circuit 110 is configured to transmit the signals of the differential signal pair to the input terminal IN1 and the input terminal IN2 of the rectifier circuit 200, respectively.

Figure 2:
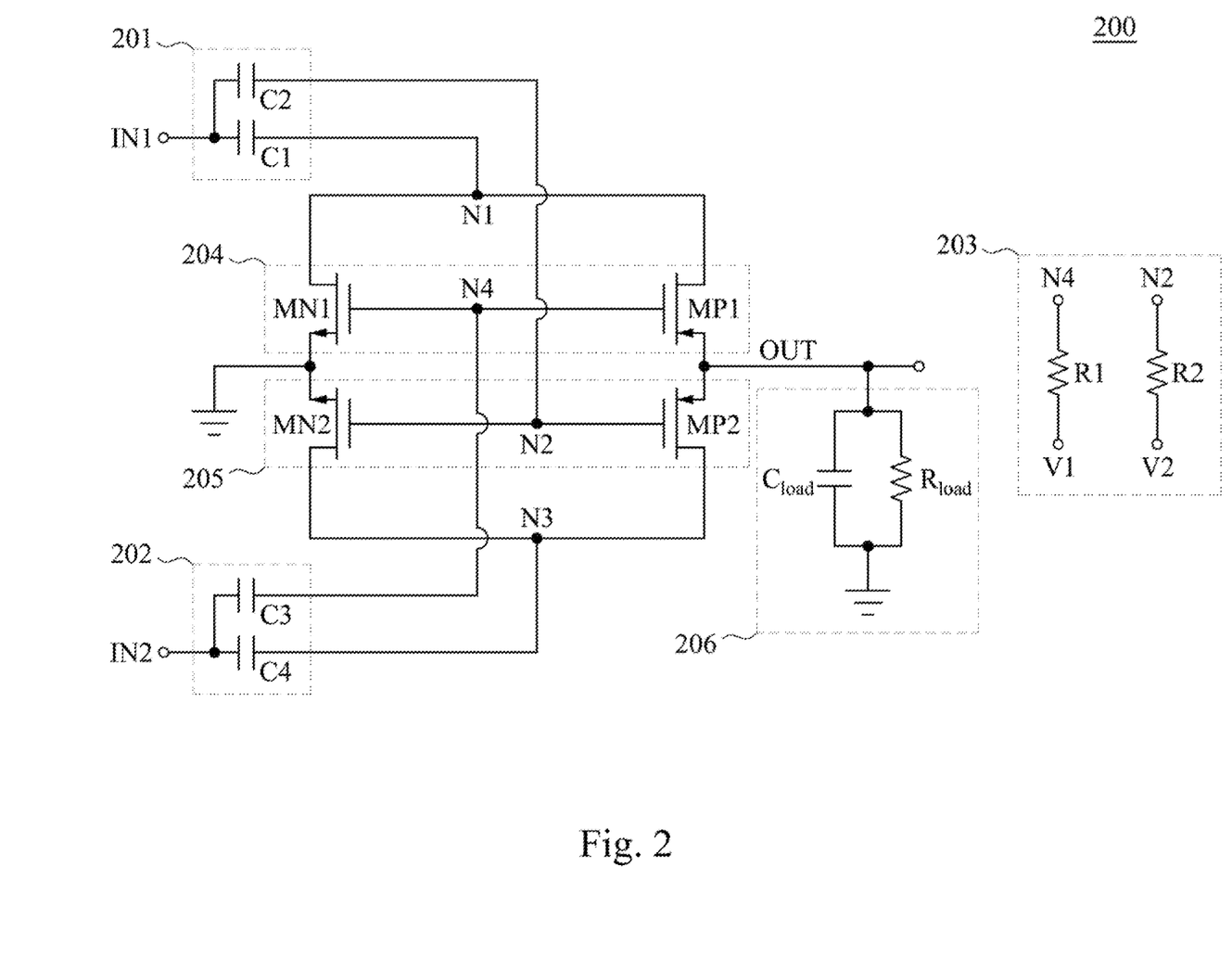
FIG. 2 is a schematic diagram of a rectifier circuit in accordance with some embodiments of the present disclosure.

Reference is now made to FIG. 2. FIG. 2 is a schematic diagram of the rectifier circuit 200 in accordance with various embodiments. In some embodiments, the rectifier circuit 200 is configured to rectify the differential signal pair received by the input terminal IN1 and the input terminal IN2 and generate an output signal with one-directional current at the output terminal OUT.

For illustration, the rectifier circuit 200 includes a match circuit 201, a match circuit 202, a bias circuit 203, a switch set 204 and a switch set 205. As shown in FIG. 2, in some embodiments, the match circuit 201 has two output terminals, and the two output terminals are coupled to a node N1 and a node N2 in the rectifier circuit 200 respectively. Similarly, the match circuit 202 has two output terminals coupled to a node N3 and a node N4 in the rectifier circuit 200 respectively. The bias circuit 203 is coupled to the node N3 and the node N4. Two input terminals of the switch set 204 are coupled to the node N1 and the node N4 respectively and the switch set 204 is coupled to the output terminal OUT. Two input terminals of the switch set 205 are coupled to the node N2 and the node N3 respectively and the switch set 205 is coupled to the output terminal OUT.

In the embodiments of FIG. 2, the rectifier circuit 200 further includes a load circuit 206. According to some embodiments, the load circuit 206 is configured to filter an output signal at the output terminal OUT and provide a bias voltage to the output terminal OUT. In some embodiments, the load circuit 206 includes a capacitor $C_{load}$ and a resistor $R_{load}$. As shown in FIG. 2, a terminal of the capacitor $C_{load}$ is coupled to the output terminal OUT and the other terminal of the capacitor $C_{load}$ is grounded. A terminal of the resistor $R_{load}$ is coupled to the output terminal OUT and the other terminal of the resistor $R_{load}$ is grounded.

In some embodiments, the switch set 204 is configured to rectify the signal received from the node N1. For example, the switch set 204 eliminates the negative half of the signal received from the node N1 and generates the output signal at the output terminal OUT according to only the positive half of the signal received from the node N1. Similarly, the switch set 205 is configured to rectify the signal received from the node N3 and to output a rectified output signal at the output terminal OUT.

According to various embodiments of the present disclosure, the switch set 204 and the switch set 205 are configured to generate output signals having same current direction and/or voltage polarity. For example, in some embodiments, the switch set 204 and the switch set 205 are configured to eliminate the negative half of the received signal, and generate the output signal at the output terminal OUT according to the positive half of the received signal.

In some embodiments, when the voltage value of the one of the differential signal pair input to the rectifier circuit 200 at the input terminal IN1 is larger than the voltage value of the other one of the differential signal pair input to the rectifier circuit 200 at the input terminal IN2 (i.e., the signal input to the input terminal IN1 is in the positive half cycle and the signal input to the input terminal IN2 is in the negative half cycle), the switch set 204 is configured to update the output signal at the output terminal OUT according to the signal from the node N1. In other word, one switch (e.g., switch MP1) of the switch set 204 turns on to transmit the signal received from the node N1 to the output terminal OUT as the output signal. The switch set 205 is configured to eliminate the signal from the node N3. Specifically, for example, one switch (e.g., switch MN2) of the switch set 205 turns on to transfer charge at the node N3 to the ground (to make the voltage value of the node N3 close to the voltage value of the ground).

On the contrary, when the one of the differential signal pair input to the rectifier circuit 200 at the input terminal IN2 is larger than the other one of the differential signal pair input to the rectifier circuit 200 at the input terminal IN1 (the signal input to the input terminal IN2 is in the positive half cycle and the signal input to the input terminal IN1 is in the negative half cycle), the switch set 205 is configured to update the output signal at the output terminal OUT according to the signal from the node N3. The switch set 204 is configured to eliminate the signal from the node N1. Specifically, for example, the switch set 204 is configured to transfer charge at the node N1 to the ground.

In operation, according to some embodiments of the present disclosure, the switch set 204 includes the switch MP1 and a switch MN1. In some embodiment, the switch MP1 is configured to update the output signal at the output terminal OUT according to the positive half waveform of the signal from the node N1 and the switch MN1 is configured to transfer charge at the node N1 to the ground when the signal from the node N1 is in the negative half cycle.

In addition, the switch set 205 includes a switch MP2 and the switch MN2. In some embodiments, the switch MP2 is configured to update the output signal at the output terminal OUT according to the positive half waveform of the signal from the node N3 and the switch MN2 is configured to transfer charge at the node N3 to the ground when the signal from the node N3 is in the negative half cycle.

In some embodiments, the switch MP1, the switch MP2, the switch MN1 and the switch MN2 include transistors. In some embodiments, the switch MP1 and the switch MP2 are P type Metal-Oxide-Semiconductor Field-Effect Transistors (PMOS) and the switch MN1 and the switch MN2 are N type Metal-Oxide-Semiconductor Field-Effect Transistors (NMOS).

In some embodiments, the switches MP1, MP2, MN1 and MN2 are transistors. A source/drain terminal of the switch MP1 is coupled to the node N1. The other source/drain terminal of the switch MP1 is coupled to the output terminal OUT. The gate terminal of the switch MP1 is coupled to the node N4. A source/drain terminal of the switch MN1 is coupled to the node N1. The other source/drain terminal of the switch MN1 is grounded. The gate terminal of the switch MN1 is coupled to the node N4. A source/drain terminal of the switch MP2 is coupled to the node N3. The other source/drain terminal of the switch MP2 is coupled to the output terminal OUT. The gate terminal of the switch MP2 is coupled to the node N2. A source/drain terminal of the switch MN2 is coupled to the node N3. The other source/drain terminal of the switch MN2 is grounded. The gate terminal of the switch MN2 is coupled to the node N2.

In some embodiments, the match circuit 201 is configured to match the input impedance of the input terminal IN1 and the output impedance of the antenna circuit 110 (make the input impedance of the input terminal IN1 equal to the output impedance of the antenna circuit 110).

As shown in FIG. 2, in some embodiments, the match circuit 201 includes a capacitor C1 and a capacitor C2 and the match circuit 202 includes a capacitor C3 and a capacitor C4. In the embodiments of FIG. 2, the capacitor C1 is coupled between the input terminal IN1 and the node N1. The capacitor C2 is coupled between the input terminal IN1 and the node N2. The capacitor C3 is coupled between the input terminal IN2 and the node N3. The capacitor C4 is coupled between the input terminal IN2 and the node N4. In some embodiments, the capacitance of the capacitor C1 and the capacitance of the capacitor C3 are the same. The capacitance of the capacitor C2 and the capacitance of the capacitor C4 are the same.

According to various embodiments of the present disclosure, the capacitor C1 and the capacitor C2 are configured to cooperate to match the input impedance of the input terminal IN1 and the output impedance of the antenna circuit 110. Specifically, for example, the antenna circuit 110 has an output impedance Z $$\left(Z = \frac{Z1 Z2}{Z1 + Z2}\right).$$

The capacitor C1 is configured to make a signal path from the capacitor C1 have the impedance Z1 and the capacitor C2 is configured to make a signal path from the capacitor C2 have the impedance Z2 to make the input impedance of the input terminal IN1 equal to the impedance Z.

In the embodiments of FIG. 2, the capacitor C1 is configured for the impedance of a signal path from a source/drain terminal of a transistor (the switch MP1 and/or the switch MN1) to match the input impedance of the input terminal IN1 and the impedance of the antenna circuit 110 (e.g., make the impedance of the capacitor C1 and the signal path equal to the impedance Z1 described above). The capacitor C2 is configured for the impedance of a signal path from a gate terminal of a transistor (the switch MP2 and/or the switch MN2) to match the input impedance of the input terminal IN1 and the impedance of the antenna circuit 110 (e.g., make the impedance of the capacitor C2 and the signal path equal to the impedance Z2 described above).

Similarly, the capacitor C3 and the capacitor C4 are configured to cooperate to match the input impedance of the input terminal IN2 and the output impedance of the antenna circuit 110. Specifically, for example, the antenna circuit 110 has an output impedance Z $$\left(Z = \frac{Z1 Z2}{Z1 + Z2}\right).$$

The capacitor us is configured to make a signal path from the capacitor C3 have the impedance Z1 and the capacitor C4 is configured to make a signal path from the capacitor C4 have the impedance Z2 to make the input impedance of the input terminal IN2 equal to the impedance Z.

In the embodiments of FIG. 2, the capacitor C3 is configured for the impedance of a signal path from a source/drain terminal of a transistor (the switch MP2 and/or the switch MN2) to match the input impedance of the input terminal IN2 and the impedance of the antenna circuit 110 (e.g., make the impedance of the capacitor C3 and the signal path equal to the impedance Z1 described above). The capacitor C4 is configured for the impedance of a signal path from a gate terminal of a transistor (the switch MP1 and/or the switch MN1) to match the input impedance of the input terminal IN2 and the impedance of the antenna circuit 110 (e.g., make the impedance of the capacitor C4 and the signal path equal to the impedance Z2 described above).

In operation, the bias circuit 203 is configured to provide a bias voltage to the node N2 and provide a bias voltage to the node N4. In some embodiments, the bias circuit 203 is configured to provide a bias voltage to a switch (e.g., the switch MP1) in the rectifier circuit 200 to reduce startup failure of the circuit (e.g., An unexpected high voltage of the gate terminal of the switch MP1 makes the time to turn on too long.) As shown in FIG. 2, in some embodiments, the bias circuit 203 further includes a resistor R1 and a resistor R2. For illustration, according to some embodiments, a terminal of the resistor R1 is coupled to the node N4 and the other terminal of the resistor R1 is configured to receive a voltage V1. A terminal of the resistor R2 is coupled to the node N2 and the other terminal of the resistor R2 is configured to receive the voltage V2. In some embodiments, the resistance of the resistor R1 is equal to the resistance of the resistor R2.

The configurations of FIG. 2 are given for illustrative purposes. Various implements are within the contemplated scope of the present disclosure. For example, in some embodiments, the capacitor C1 and the capacitor C3 can be omitted when the impedance is matched.

Figure 3:
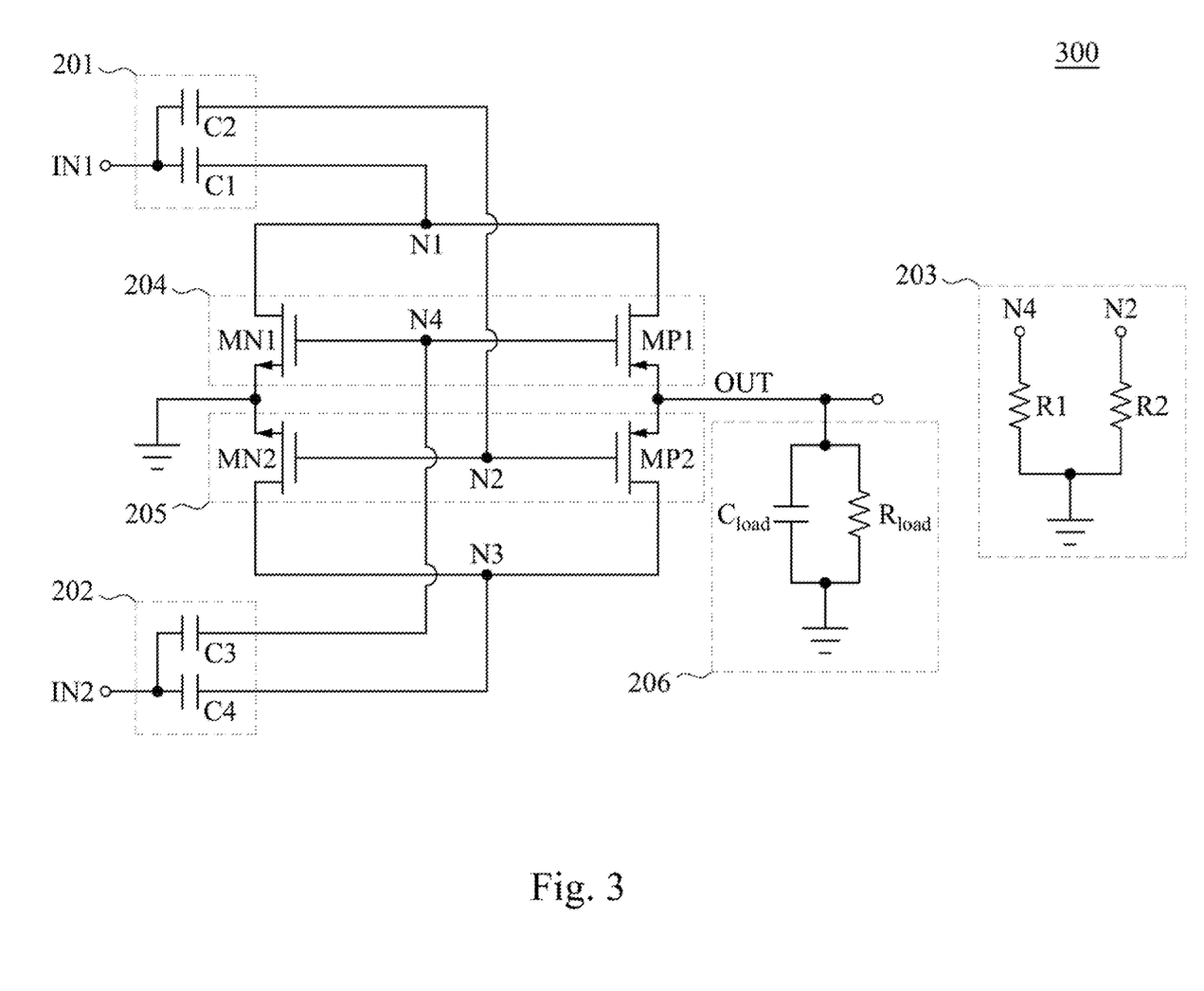
FIG. 3 is a schematic diagram of a rectifier circuit in accordance with some embodiments of the present disclosure.

Reference is now made to FIG. 3. FIG. 3 is a schematic diagram of a rectifier circuit 300 configured with respect to the rectifier circuit 200. With respect to the embodiments of FIG. 2, like elements in FIG. 3 are designated with the same reference numbers for ease of understanding. The specific operations of similar elements, which are already discussed in detail in above paragraphs, are omitted herein for the sake of brevity, unless there is a need to introduce the cooperation relationship with the elements shown in FIG. 3.

The difference between the rectifier circuit 300 and the rectifier circuit 200 is that a terminal of the resistor R1 of the rectifier circuit 300 is coupled to the node N4 and the other terminal of the resistor R1 is grounded, and a terminal of the resistor R2 of the rectifier circuit 300 is coupled to the node N2 and the other terminal of the resistor R2 is grounded.

Figure 4:
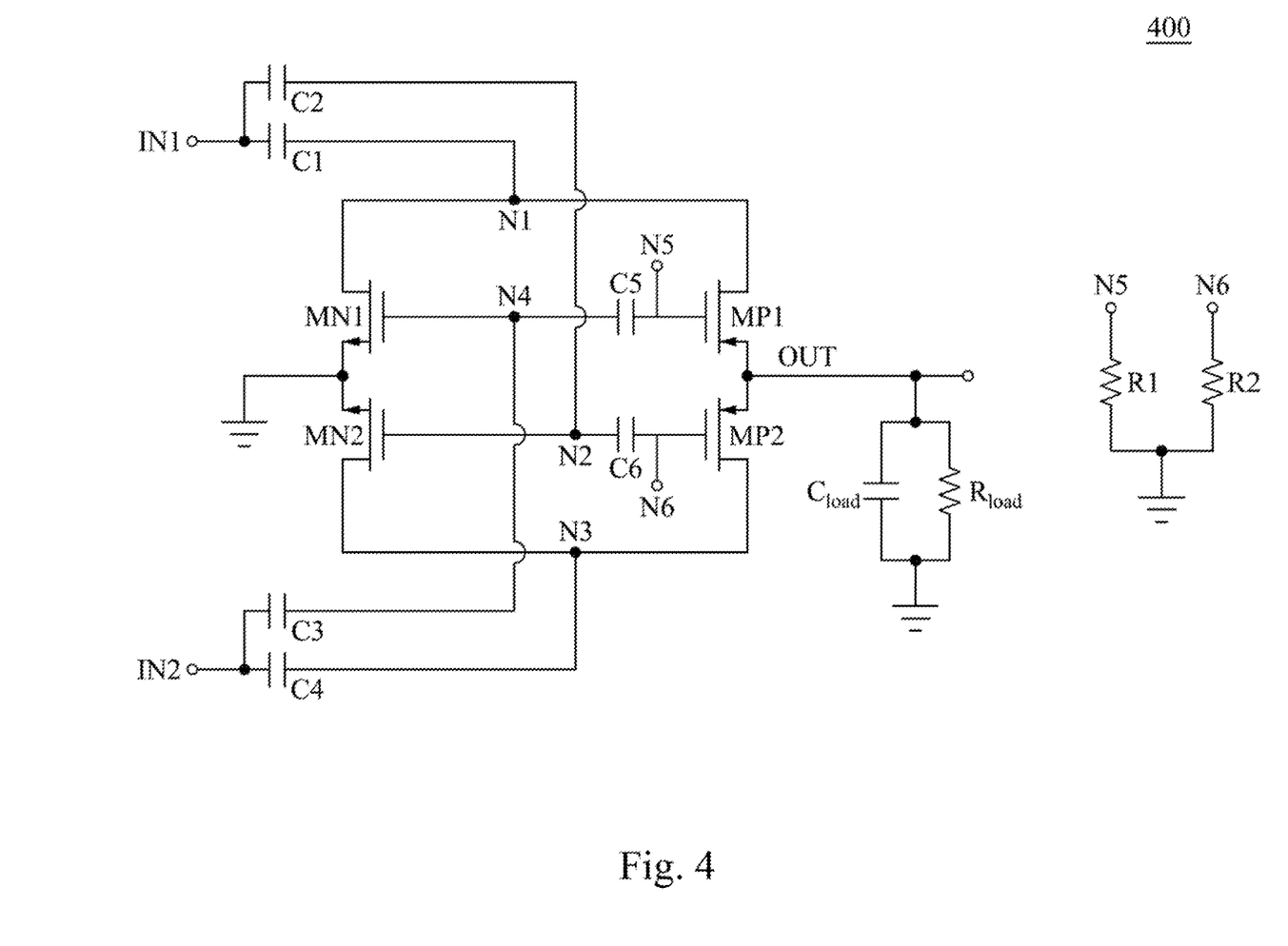
FIG. 4 is a schematic diagram of a rectifier circuit in accordance with some embodiments of the present disclosure.

Reference is now made to FIG. 4. FIG. 4 is a schematic diagram of a rectifier circuit 400 configured with respect to the rectifier circuit 300. With respect to the embodiments of FIG. 3, like elements in FIG. 4 are designated with the same reference numbers for ease of understanding.

For illustration, the difference between the rectifier circuit 400 and the rectifier circuit 300 is that the rectifier circuit 400 includes a capacitor C5 and a capacitor C6; the gate terminal of the switch MP1 is coupled to a node N5 and a terminal of the capacitor C5 and the other terminal of the capacitor C5 is coupled to the node N4; the gate terminal of the switch MP2 is coupled to a node N6 and a terminal of the capacitor C6 and the other terminal of the capacitor C6 is coupled to the node N2; and the bias circuit 203 is coupled to the node N5 and the node N6. In some embodiments, the resistor R1 is coupled between the node N5 and the ground; the resistor R2 is coupled between the node N6 and the ground.

In the embodiments of FIG. 4, the bias circuit 203 is configured to provide a bias voltage to the node N5 and provide a bias voltage to the node N6. The capacitor C5 is configured to separate the node N5 from the gate terminal of the switch MN1 to prevent the gate terminal of the switch MN1 from receiving the bias voltage provided by the bias circuit 203 (i.e., only provide the bias voltage to the gate terminal of the switch MP1). The capacitor C6 is configured to separate the node N6 from the gate terminal of the switch MN2 to prevent the gate terminal of the switch MN2 from receiving the bias voltage provided by the bias circuit 203 (i.e., only provide the bias voltage to the gate terminal of the switch MP2).

The configurations of FIG. 4 are given for illustrative purposes. Various implements are within the contemplated scope of the present disclosure. For example, in some embodiments, the capacitor C5 is coupled between the node N4 and the gate terminal of the switch MN1; the capacitor C6 is coupled between the node N2 and the gate terminal of the switch MN2.

Figure 5:
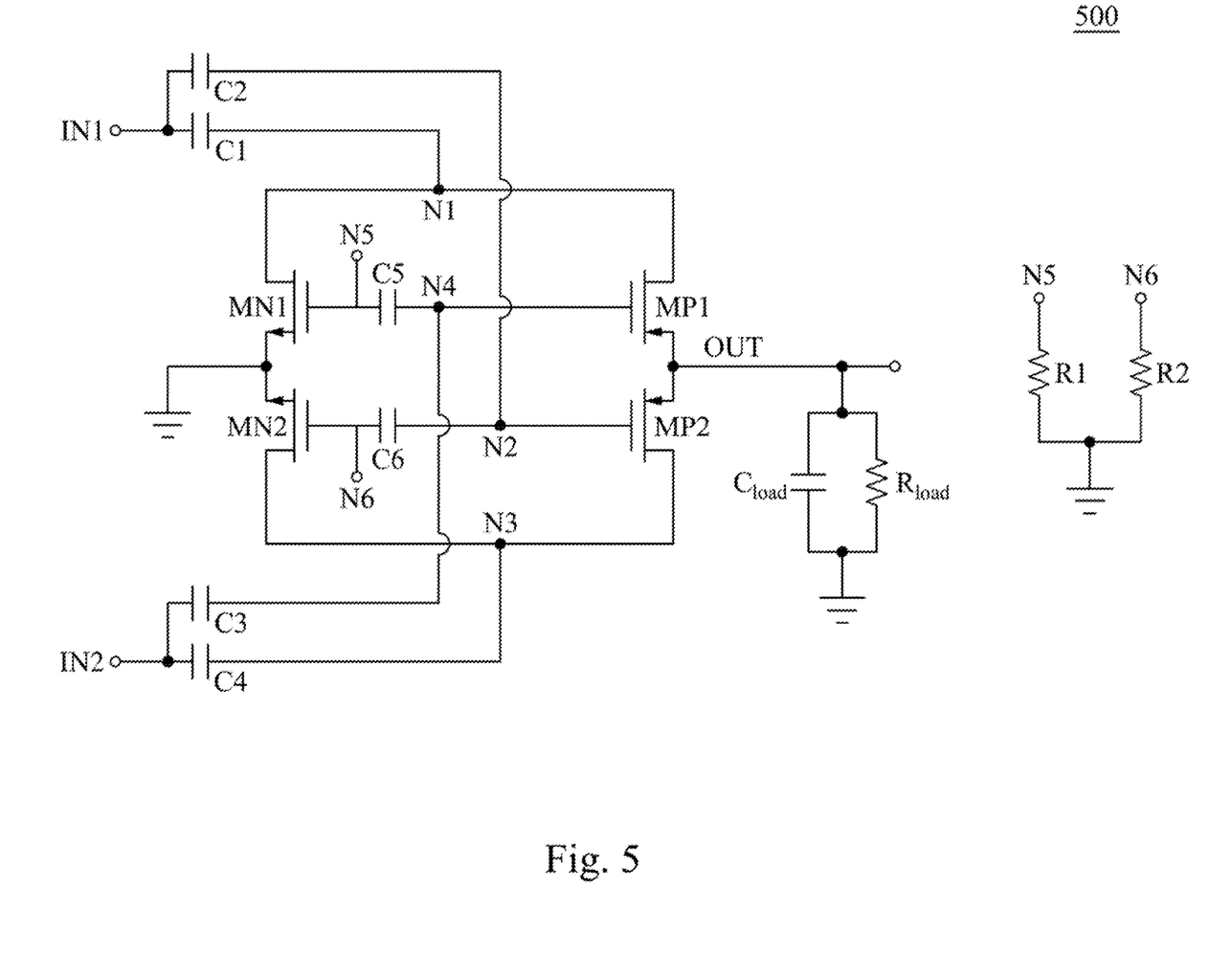
FIG. 5 is a schematic diagram of a rectifier circuit in accordance with some embodiments of the present disclosure.

Reference is now made to FIG. 5. FIG. 5 is a schematic diagram of a rectifier circuit 500 configured with respect to the rectifier circuit 400. With respect to the embodiments of FIG. 4, like elements in FIG. 5 are designated with the same reference numbers for ease of understanding.

For illustration, the difference between the rectifier circuit 500 and the rectifier circuit 400 is that, for the rectifier circuit 500, the gate terminal of the switch MN1 is coupled to the node N5 and a terminal of the capacitor C5 and the other terminal of the capacitor C5 is coupled to the node N4; the gate terminal of the switch MN2 is coupled to the node N6 and a terminal of the capacitor C6 and the other terminal of the capacitor C6 is coupled to the node N2. In some embodiments, the bias circuit 203 is coupled to the node N5 and the node N6. In some embodiments, the resistor R1 is coupled between the node N5 and the ground; the resistor R2 is coupled between the node N6 and the ground.

In the embodiments of FIG. 5, the bias circuit 203 is configured to provide a bias voltage to the node N5 and provide a bias voltage to the node N6. The capacitor C5 is configured to separate the node N5 from the gate terminal of the switch MP1 to prevent the gate terminal of the switch MP1 from receiving the bias voltage provided by the bias circuit 203 (i.e., only provide the bias voltage to the gate terminal of the switch MN1). The capacitor C6 is configured to separate the node N6 from the gate terminal of the switch MP2 to prevent the gate terminal of the switch MP2 from receiving the bias voltage provided by the bias circuit 203 (i.e., only provide the bias voltage to the gate terminal of the switch MN2).

The configurations of FIG. 5 are given for illustrative purposes. Various implements are within the contemplated scope of the present disclosure. For example, in some embodiments, the capacitor C5 is coupled between the node N4 and the gate terminal of the switch MP1; the capacitor C6 is coupled between the node N2 and the gate terminal of the switch MP2.

Figure 6:
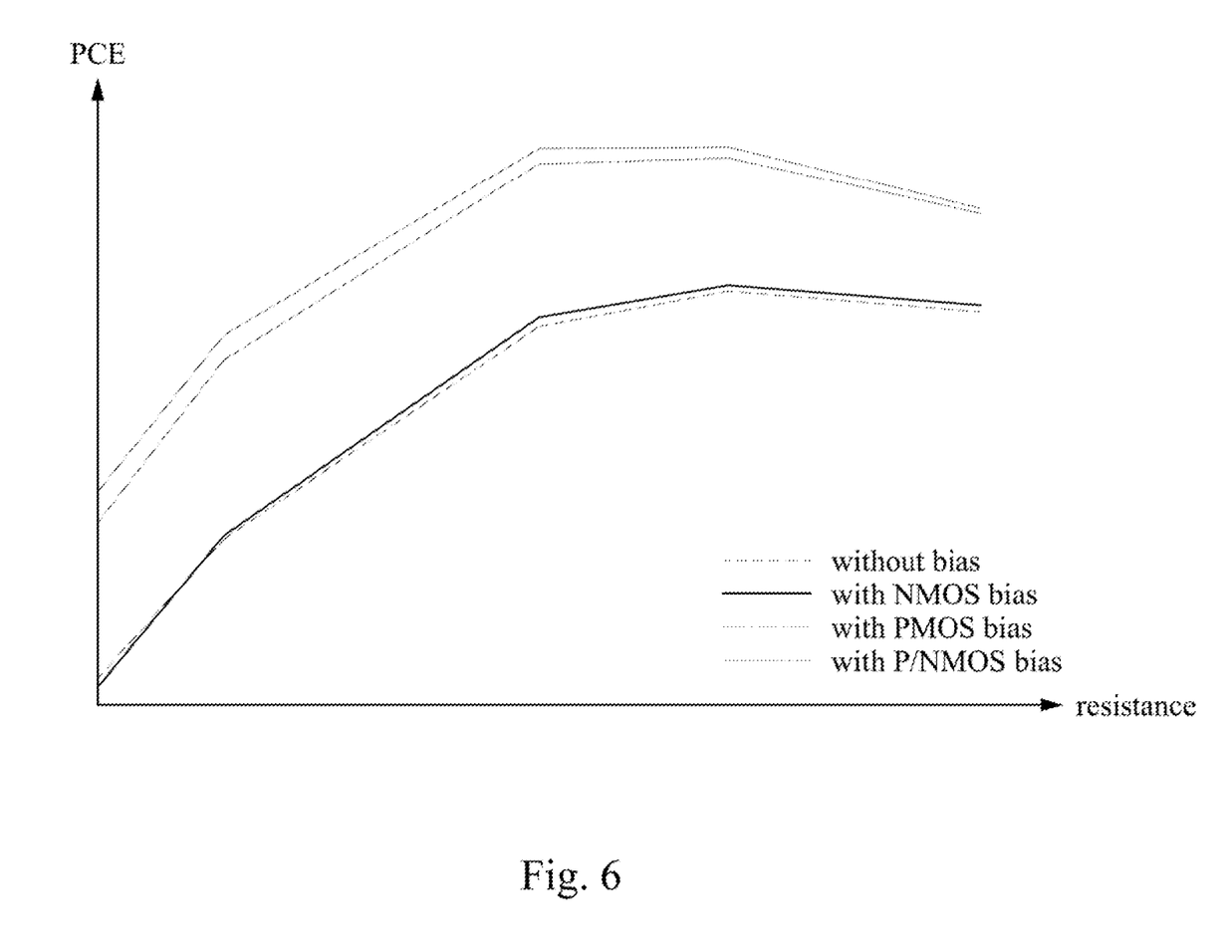
FIG. 6 is a schematic diagram of an example relationship of power conversion efficiency and resistance of a resistor in accordance with various embodiments.

Reference is now made to FIG. 6. FIG. 6 is a schematic diagram of an example relationship of power conversion efficiency (PCE) and resistance of the resistor $R_{load}$ in accordance with various embodiments. In the embodiments of FIG. 6, the PCE is equal to the output power of the output terminal OUT divided by the input power received by the antenna circuit 110. FIG. 6 depicts the relationship between the PCE and the resistance of the resistor $R_{load}$ of the rectifier circuit 300 (annotated as "with P/NMOS bias") according to some embodiments. FIG. 6 depicts the relationship between the PCE and the resistance of the resistor $R_{load}$ of the rectifier circuit 300 without the bias circuit 203 (annotated as "without bias") according to some embodiments. FIG. 6 depicts the relationship between the PCE and the resistance of the resistor $R_{load}$ of the rectifier circuit 400 (annotated as "with PMOS bias") according to some embodiments. FIG. 6 depicts the relationship between the PCE and the resistance of the resistor $R_{load}$ of the rectifier circuit 500 (annotated as "with NMOS bias") according to some embodiments.

As shown in FIG. 6, according to some embodiments of the present disclosure, the rectifier circuit 300 and the rectifier circuit 400 have PCE better than the PCE of the rectifier circuit 500 and the rectifier circuit 300 without the bias circuit 203. In some embodiments, the PCE of the rectifier circuit 300 and the rectifier circuit 400 is about 1.1 times the PCE of the rectifier circuit 500 and the rectifier circuit 300 without the bias circuit 203. In some embodiments, when the input power received by the antenna circuit 110 is −10 dBm, the PCE of the rectifier circuit 300 is about 24.3% and the PCE of the rectifier circuit 300 without the bias circuit 203 is about 22.4% (including the power consumption of the balun but omitting the power consumption of the antenna).

As described above, the present disclosure provides a receiver circuit and a rectifier circuit thereof. The rectifier circuit of the present disclosure provides a stable bias voltage to the switches of the rectifier circuit through a bias circuit to avoid the circuit startup failure. In addition, the match circuit designed with respect to the bias circuit of the present disclosure achieves impedance matching by coupling to a capacitor in series. In this way, usage of elements with large volume (e.g., an inductor) can be reduced. Utilizing the receiver circuit of the present disclosure at an energy converting circuit like a radio frequency energy harvest circuit helps improve the power conversion efficiency thereof.

While the disclosure has been described by way of example(s) and in terms of the preferred embodiment(s), it is to be understood that the disclosure is not limited thereto. Those skilled in the art may make various changes, substitutions, and alterations herein without departing from the spirit and scope of the present disclosure. In view of the foregoing, it is intended that the present invention cover modifications and variations of this invention provided they fall within the scope of the following claims.

What is claimed is:

1. A rectifier circuit, comprising:
a first match circuit that has a first terminal and a second terminal and is configured to receive a first input signal;
a second match circuit configured to receive a second input signal, wherein the first input signal and the second input signal are inverted;
a bias circuit configured to provide a first bias voltage to the second terminal of the first match circuit and to provide a second bias voltage to a first terminal of the second match circuit;
a first switch that is coupled to the first terminal of the first match circuit and an output terminal of the rectifier circuit and is configured to turn on in response to a first signal from the first terminal of the second match circuit and to update an output signal at the output terminal according to the first input signal when a voltage value of the first input signal is larger than a voltage value of the second input signal; and
a second switch that is coupled to a second terminal of the second match circuit and the output terminal and is configured to turn on in response to a second signal from the second terminal of the first match circuit and to update the output signal according to the second input signal when the voltage value of the second input signal is larger than the voltage value of the first input signal.

2. The rectifier circuit of claim 1, wherein the first match circuit comprises:
a first capacitor coupled between an input terminal of the first match circuit and the first terminal of the first match circuit, wherein the input terminal of the first match circuit is configured to receive the first input signal; and
a second capacitor coupled between the input terminal of the first match circuit and the second terminal of the first match circuit,
wherein the second match circuit comprises:
a third capacitor coupled between an input terminal of the second match circuit and the first terminal of the second match circuit, wherein the input terminal of the second match circuit is configured to receive the second input signal; and
a fourth capacitor coupled between the input terminal of the second match circuit and the second terminal of the second match circuit.

3. The rectifier circuit of claim 2, wherein a capacitance of the first capacitor is equal to a capacitance of the third capacitor and a capacitance of the second capacitor is equal to a capacitance of the fourth capacitor.

4. The rectifier circuit of claim 1, further comprising:
a third switch that is coupled to the first terminal of the first match circuit and a ground terminal of the rectifier circuit and is configured to turn on in response to the first signal when the voltage value of the first input signal is smaller than the voltage value of the second input signal; and
a fourth switch that is coupled to the second terminal of the second match circuit and the ground terminal and is configured to turn on in response to the second signal when the voltage value of the second input signal is smaller than the voltage value of the first input signal.

5. The rectifier circuit of claim 4, wherein a gate terminal of the first switch is coupled to the first terminal of the second match circuit, and a gate terminal of the second switch is coupled to the second terminal of the first match circuit,
wherein the rectifier circuit further comprises:
a first capacitor coupled between the first terminal of the second match circuit and a gate terminal of the third switch; and
a second capacitor coupled between the second terminal of the first match circuit and a gate terminal of the fourth switch.

6. The rectifier circuit of claim 4, wherein the first switch and the second switch are P type transistors, and the third switch and the fourth switch are N type transistors.

7. The rectifier circuit of claim 1, wherein the bias circuit comprising:
a first resistor, wherein a first terminal of the first resistor is coupled to the second terminal of the first match circuit and a second terminal of the first resistor is configured to receive a first voltage; and a second resistor, wherein a first terminal of the second resistor is coupled to the second terminal of the second match circuit and a second terminal of the second resistor is configured to receive a second voltage.

8. The rectifier circuit of claim 7, wherein the second terminal of the first resistor and the second terminal of the second resistor are grounded.

9. A receiver circuit, comprising:
an antenna circuit; and
a rectifier circuit configured to generate an output signal at an output terminal of the rectifier circuit and comprising:
    a first switch set that has a first input terminal and a second input terminal and is configured to rectify a first signal from the first input terminal of the first switch set to update the output signal;
    a second switch set that has a third input terminal and a fourth input terminal and is configured to rectify a second signal from the third input terminal of the second switch set to update the output signal, wherein the first signal and the second signal are inverted;
    a bias circuit configured to provide a first bias voltage to the second input terminal of the first switch set and to provide a second bias voltage to the fourth input terminal of the second switch set; and
    a first match circuit and a second match circuit which are configured to match an impedance of the antenna circuit with an impedance of the rectifier circuit,
    wherein the first match circuit has a first output terminal coupled to the first input terminal of the first switch set and a second output terminal coupled to the fourth input terminal of the second switch set, and
    the second match circuit has a third output terminal coupled to the third input terminal of the second switch set and a fourth output terminal coupled to the second input terminal of the first switch set.

10. The receiver circuit of claim 9, wherein the first match circuit is configured to receive a first input signal of a differential input signal pair, and the second match circuit is configured to receive a second input signal of the differential input signal pair,
wherein the first switch set comprises:
    a first switch that is coupled to the first input terminal of the first switch set and the output terminal of the rectifier circuit and is configured to turn on in response to a third signal from the second input terminal of the first switch set and to update the output signal according to the first input signal when a voltage value of the first input signal is larger than a voltage of the second input signal,
wherein the second switch set comprises:
    a second switch that is coupled to the third input terminal of the second switch set and the output terminal of the rectifier circuit and is configured to turn on in response to a fourth signal from the fourth input terminal of the second switch set and to update the output signal according to the second input signal when the voltage value of the second input signal is larger than the voltage value of the first input signal.

11. The receiver circuit of the claim 10, wherein the first switch set further comprises:
a third switch that is coupled to the first input terminal of the first switch set and a ground terminal of the rectifier circuit and is configured to turn on in response to the third signal and to transfer a charge at the first input terminal of the first switch set to the ground terminal when the voltage value of the second input signal is larger than the voltage value of the first input signal,
wherein the second switch set further comprises:
    a fourth switch that is coupled to the third input terminal of the second switch set and the ground terminal and is configured to turn on in response to the fourth signal and to transfer a charge at the second input terminal of the second switch set to the ground terminal when the voltage value of the second input signal is larger than the voltage value of the first input signal.

12. The receiver circuit of claim 9, wherein the bias circuit comprises:
a first resistor, wherein a first terminal of the first resistor is coupled to the second input terminal of the first switch set and a second terminal of the first resistor is grounded; and
a second resistor, wherein a first terminal of the second resistor is coupled to the fourth input terminal of the second switch set and a second terminal of the second resistor is grounded.

13. The receiver circuit of claim 9, wherein the first match circuit comprises:
a first capacitor coupled between an input terminal of the first match circuit and the first output terminal of the first match circuit; and
a second capacitor coupled between the input terminal of the first match circuit and the second output terminal of the first match circuit,
wherein the second match circuit comprises:
    a third capacitor coupled between an input terminal of the second match circuit and the third output terminal of the second match circuit; and
    a fourth capacitor coupled between the input terminal of the second match circuit and the fourth output terminal of the second match circuit.

14. A rectifier circuit, comprising:
a first capacitor and a second capacitor, wherein a first terminal of the first capacitor and a first terminal of the second capacitor are coupled to a first input terminal of the rectifier circuit;
a third capacitor and a fourth capacitor, wherein a first terminal of the third capacitor and a first terminal of the fourth capacitor are coupled to a second input terminal of the rectifier circuit;
a first resistor, wherein a first terminal of the first resistor is coupled to a second terminal of the fourth capacitor and a second terminal of the first resistor is grounded;
a second resistor, wherein a first terminal of the second resistor is coupled to a second terminal of the second capacitor and a second terminal of the second resistor is grounded;
a first transistor, wherein a gate terminal of the first transistor is coupled to the first terminal of the first resistor, a first source/drain terminal of the first transistor is coupled to a second terminal of the first capacitor and a second source/drain terminal of the first transistor is coupled to an output terminal of the rectifier circuit;
a second transistor, wherein a gate terminal of the second transistor is coupled to first terminal of the first resistor, a first source/drain terminal of the second transistor is coupled to the second terminal of the first capacitor and a second source/drain terminal of the second transistor is grounded;

a third transistor, wherein a gate terminal of the third transistor is coupled to the first terminal of the second resistor, a first source/drain terminal of the third transistor is coupled to a second terminal of the third capacitor and a second source/drain terminal of the third transistor is coupled to the output terminal; and a fourth transistor, wherein a gate terminal of the fourth transistor is coupled to the first terminal of the second resistor, a first source/drain terminal of the fourth transistor is coupled to the second terminal of the third capacitor and a second source/drain terminal of the fourth transistor is grounded, wherein the first to the fourth capacitors, the first resistor, the second resistor and the first to the fourth transistors are configured to cooperate to rectify a differential signal pair received from the first input terminal and the second input terminal and to output a rectified signal at the output terminal.

15. The rectifier circuit of claim 14, further comprising:
a load circuit that comprises:
a third resistor, wherein a first terminal of the third resistor is coupled to the output terminal and a second terminal of the third resistor is grounded; and
a fifth capacitor, wherein a first terminal of the fifth capacitor is coupled to the output terminal and a second terminal of the fifth capacitor is grounded.

16. The rectifier circuit of claim 14, wherein the first capacitor and the second capacitor are configured to make a first input impedance of the first input terminal match an impedance of an antenna circuit,
wherein the third capacitor and the fourth capacitor are configured to make a second input impedance of the second input terminal match the impedance of the antenna circuit.

17. The rectifier circuit of claim 14, further comprising:
a fifth capacitor coupled between the gate terminal of the second transistor and the first terminal of the first resistor; and
a sixth capacitor coupled between the gate terminal of the fourth transistor and the first terminal of the second resistor.

18. The rectifier circuit of claim 14, further comprising:
a fifth capacitor coupled between the gate terminal of the first transistor and the first terminal of the first resistor; and
a sixth capacitor coupled between the gate terminal of the third transistor and the first terminal of the second resistor.

19. The rectifier circuit of claim 14, wherein a conductive type of the first transistor and a conductive type of the second transistor are different from each other, and a conductive type of the third transistor and a conductive type of the fourth transistor are different from each other.

20. The rectifier circuit of claim 14, wherein a resistance of the first resistor is equal to a resistance of the second resistor, a capacitance of the first capacitor is equal to a capacitance of the third capacitor, and a capacitance of the second capacitor is equal to a capacitance of the fourth capacitor.

* * * * *